CURRENT FLOW FOR CONTINUOUS (I) AND
INTERRUPTED DEPOSITION (II) (350 VOLTS)

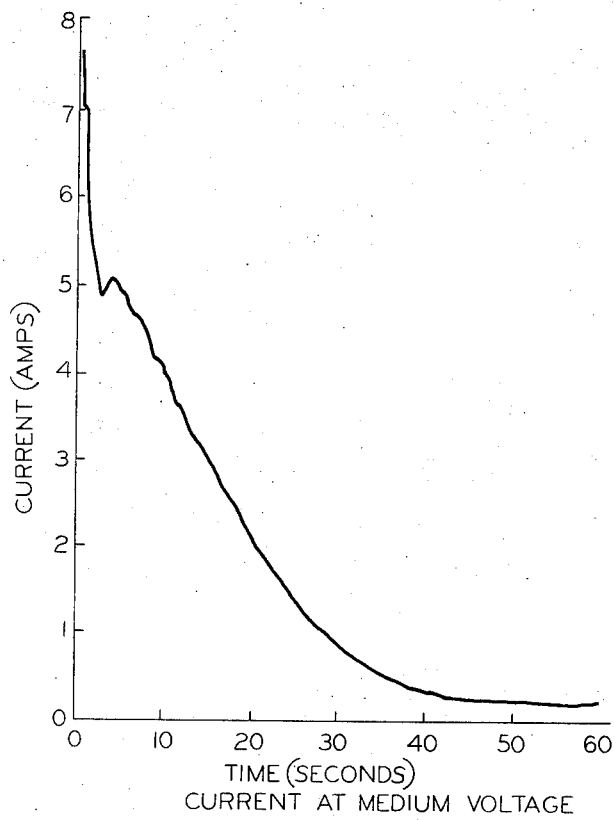
Fig. 1a  CURRENT AT MEDIUM VOLTAGE
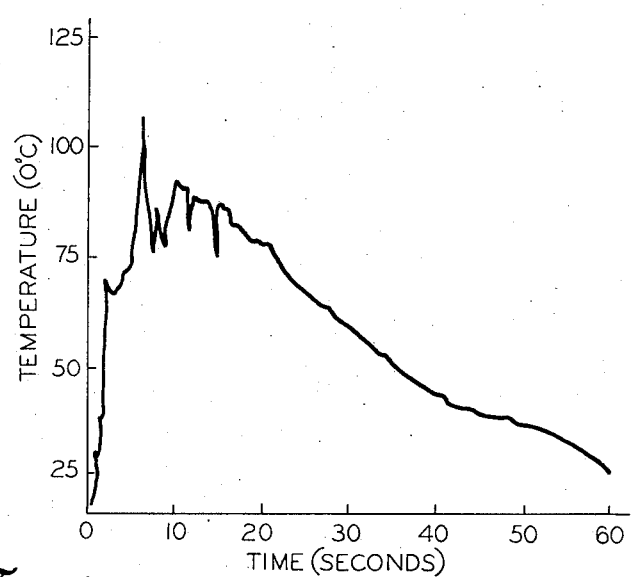
Fig. 1b  FILM TEMPERATURE DURING DEPOSITION

TEMPERATURE PROFILES FOR CONTINUOUS (I) AND
INTERRUPTED DEPOSITIONS (II) (350 VOLTS)

United States Patent Office 3,809,634
Patented May 7, 1974

3,809,634
INTERRUPTED CURRENT ELECTRODEPOSITION OF PAINTS
William B. Brown, Birmingham, and Gregory A. Campbell, Romeo, Mich., assignors to General Motors Corporation, Detroit, Mich.
Filed Nov. 29, 1972, Ser. No. 310,328
Int. Cl. C23b 13/00
U.S. Cl. 204—181                                              4 Claims

ABSTRACT OF THE DISCLOSURE

Electrodeposition of water dispersible paint resins on a metallic, anodic electrode substrate can be accomplished at voltages above the normal rupture voltage for the particular resin to achieve better throw of the paint coating by measuring the flow of current during the coating process and interrupting the flow of current a few occasions at specific times. In a typical electrophoretic resin deposition process, during the first seconds there is a high current flow which quickly decreases. If one is electrodepositing at a voltage near or above the rupture voltage of the resin employed, the current will then start to increase again. By interrupting the current before or just after the current flow has increased, film rupture may be minimized or avoided and a smoother, more coextensive paint film obtained. Current flow is then soon reinstated and interrupted again, this being repeated up to three to five times, after which there is no further tendency for the current to increase and the deposition may be completed at the relatively high voltage without further current interruptions.

---

Figure 2A:
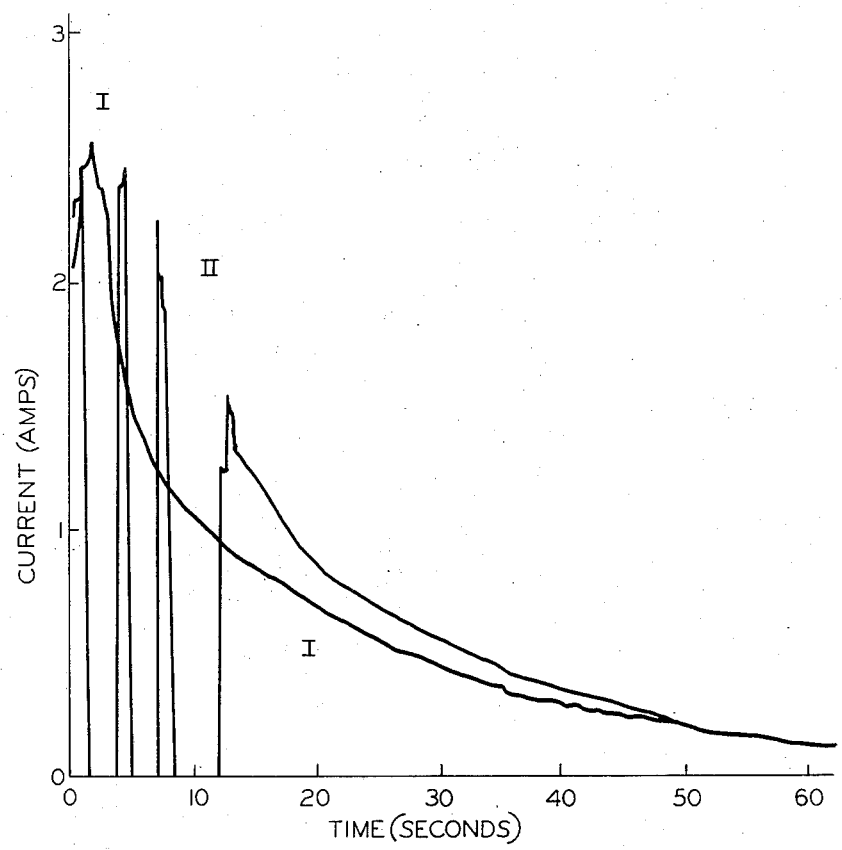
Figure 2B:
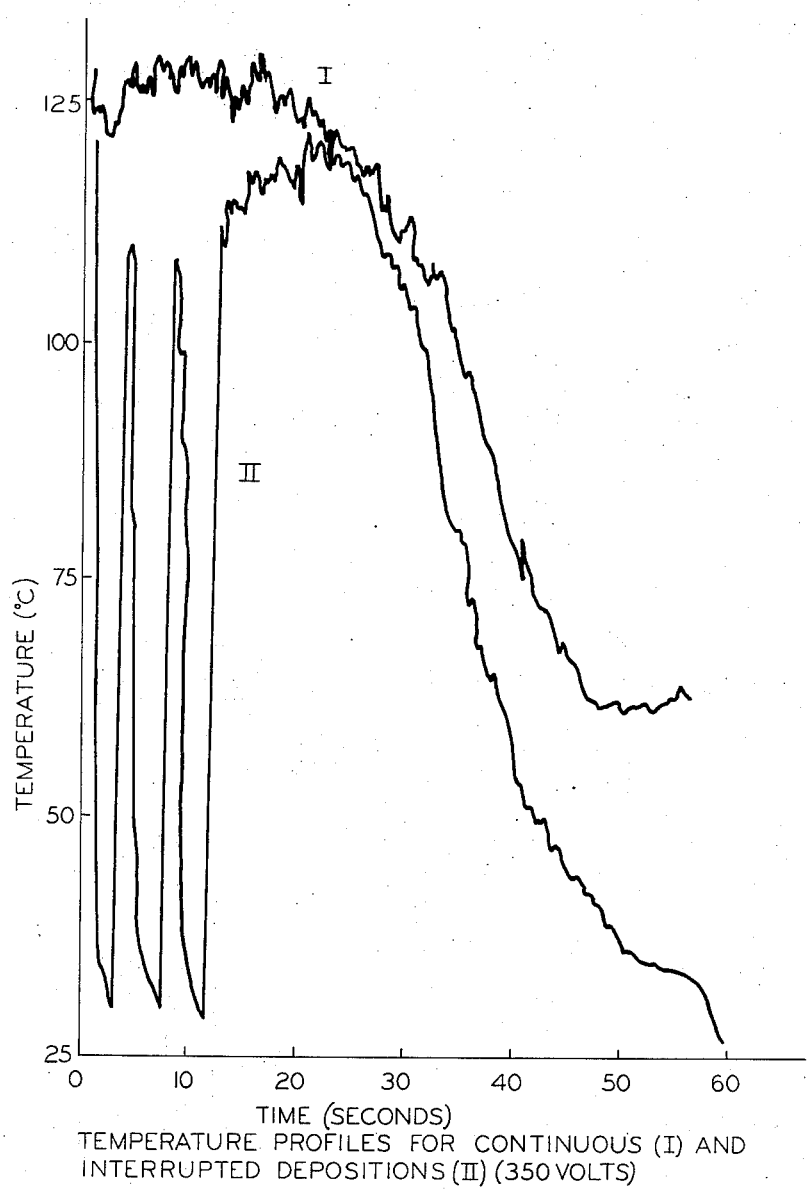

This invention pertains to the electrophoretic deposition of base solubilized, polycarboxylic acid resins on metallic, anodic electrode substrates. More specifically, this invention pertains to a method of carrying out such a painting process at a voltage at or above the normal rupture voltage of the particular resin employed to achieve better throw of the resin and better paint coverage without producing imperfections in the paint film, commonly known as "rupture."

The art of painting metallic substrates by electrophoretically depositing pigmented, base solubilized, synthetic resin onto the substrate is now widely practiced. One significant advantage of such a painting process is that a uniform film buildup is obtained over a substantial portion of the substrate. This is particularly important for corrosion resistance, for example, on automobile car bodies. It is known that, in general, the higher the voltage at which the resin is deposited, the greater the "throw" of the electrophoretically deposited paint film. By "throw" is meant that the resin is deposited deeper into the nooks and crannies of a substate of complex or irregular configuration. However, the voltage at which the resin is deposited cannot be increased indefinitely to achieve greater throw because it is found that paint film will rupture to produce holes or nonuniformities of thickness in the paint film which either permit corrosion to take place or are unsightly, or both. The rupture voltage varies for each resin system employed and, in fact, also is a function of the chemistry of the bath in which the resin is dispersed. Some resins have higher rupture voltages than others. Presently, high rupture voltages are considered to be in the range of 300 to 500 volts. However, it is desirable to deposit the paint resin at still higher voltages to obtain more complete coverage on a car body or other article for purposes of corrosion resistance and the like.

It is an object of the present invention to provide a method of depositing a base solubilized, polycarboxylic acid resin containing paint on a metallic, anodic electrode substrate at a voltage near or above the normal rupture voltage of the resin by interrupting the flow of current up to about five times during the early stages of the deposition before the value of the current flow and film temperature increases to a high value at which paint rupture would occur.

It is a more specific object of the present invention to provide a method of electrophoretically depositing suitable base solubilized, polycarboxylic acid resins on a metallic, anodic electrode substrate wherein the value of the deposition current flow is followed, and the current flow interrupted whenever the value of the current starts to increase after it has started to decrease.

In accordance with a preferred embodiment of our invention, these and other objects and advantages are accomplished by initially providing a painting tank with a suitable aqueous dispersion of base solubilized, polycarboxylic acid resin and suitable pigments, solvents and the like as may be required for a particular application, as are well known in the art. Either the painting tank is rendered cathodic in an electrodeposition circuit or special cathodic electrodes are placed in the tank. The articles to be painted are rendered anodic, and when they are immersed in the bath a direct electric current is caused to flow which effects the deposition of the resin and pigments upon the anodic substrate. In accordance with our invention we detect and follow the value of the current flow, particularly during the early stages of the film deposition. In the first second or less of deposition the current flow may be relatively high but is seen to quickly decrease if the anodic substrate is immersed before the power is turned on. For purposes of our invention this initial high current flow can be ignored. When one is plating or coating at voltages above the normal rupture voltage for the resin bath composition, the current, although initially decreasing, will soon start to increase during the first few seconds of deposition. If one continues to deposit paint at this constant voltage the current will continue to increase, raising the temperature of the film until water or other liquids in the paint film boil, thereby causing sections of the film to rupture. We interrupt the flow of current prior to the time at which it reaches a peak value which would cause film rupture. The time taken before the current reaches this maximum value depends upon the resin composition and applied voltage. However, it is almost always less than ten seconds after the start of current flow. The interruption is continued for up to a few seconds, preferably no more than ten seconds, to permit the film to cool. Current flow is then reinstated. The value of the current flow is again followed and the current flow again interrupted if its value increases toward the maximum value previously noted. Again the interruption is continued for a few seconds until the paint film is cooled by the bath. This process of initiating current flow and interrupting it is repeated at least once and up to five times until there is no further tendency for the value of the current flow to increase once the flow has been reinstated. The deposition is then continued without interruption until a coating of film thickness of predetermined value is obtained.

In this way a resin film can be electrodeposited at voltages substantially in excess of the normal rupture voltage at which faulty paint film would be deposited at uninterrupted current flow. Even at electrodeposition voltages at or below the rupture voltage we find that improved paint films are obtained in accordance with our process. We interrupt the current flow the minimum number of times possible to avoid film rupture. Accordingly, we obtain the advantages of the widest possible film throw and resultant corrosion resistance, while at the same time maximizing the efficiency of the deposition process by minimizing the period in which no current is flowing.

These and other objects and advantages of our invention will be more fully appreciated from a detailed description thereof which follows. In the description reference will be made to the drawings, in which:

FIG. I*a* is a graph of current flow in amperes versus time in seconds representing an actual paint deposition cycle conducted at a voltage just below the rupture voltage of the resin employed;

FIG. I*b* is a graph of film temperature in degrees centigrade versus time in seconds during the same film deposition process;

FIG. II*a* represents two superimposed plots of current flow versus time for continuous (I) and interrupted (II) deposition of a paint resin well above its rupture voltage; and FIG. II*b* are superimposed plots of film temperature versus time for the continuous (I) and interrupted (II) deposition of the same process depicted in FIG. II*a*.

During the electrodeposition of water-based paints, coating defects can be encountered when film rupture occurs. This rupture has been referred to as "blowing" or "gassing" of the coating and results when the local current density and film resistance combine to exceed a critical value. The film rupture produces a hole in the paint film or roughness due to differences in paint film thickness. When a particular resin composition is deposited at increasing but constant voltages without current interruption there is eventually reached a maximum voltage, the rupture voltage, at which the described defects in the film occur. Previous investigations have led to a number of erroneous explanations for the rupture process. By measuring and following both the temperature of the film as it is deposited and the value of the current effecting the film deposition, we have found that rupture is caused when the temperature of the film exceeds the boiling point of the liquid entrained therein. When the liquid boils, portions of the film are removed, and if the voltage is quite high, substantial current flow may take place to produce widespread destruction of the film. Rupture usually does not occur until a large percentage of the film has already been deposited.

In FIGS. I*a* and I*b* are graphs of the current versus time, and film temperature during deposition versus time, respectively, in a typical deposition process. Here the anode was immersed in the bath before the power was turned on. The voltage was below but near the rupture voltage for the resin system employed. When the power was first turned on, the initial current flow is governed almost completely by the bath resistance since there is little or no film. The initial film temperature is low because little film has formed and there is little film heating due to $I^2R$ losses. However, the current flow is relatively high due to the low overall resistance. As the film builds, its electrical resistance increases, increasing the heat generated within the film and at the same time decreasing the current. However, as the film becomes warmer its resistance tends to decrease. At sufficiently high voltages there is produced an inflection in the current curve, seen to occur at about four seconds in FIG. I*a*, and the current actually increases for a short period of time until the film becomes sufficiently thick to effect a subsequent reduction in the current flow. It is seen, by reference to FIG. I*b*, that when the current is increasing, the temperature also rapidly increases momentarily to about 110° C. which approaches the boiling point of the liquids in the film. Since this deposition was undertaken below the rupture voltage the film resistance gradually caused a decrease in the current flow and the temperature also decreased during the rest of the deposition process. No boiling of liquids in the film or film rupture occurred.

At lower deposition voltages than that depicted in FIGS. I*a* and I*b*, there is typically no inflection in the current versus time curve, and film heating is no problem so far as rupture is concerned. However, at significantly higher voltages, if the current is not interrupted, localized boiling of film liquids will take place and the current may continue to increase to produce further rupture of the paint film. The purpose of our invention is to permit significant increases in the deposition voltages to obtain better throw and film coverages without causing the film temperature to increase to the point at which the liquid boils and rupture occurs.

The inflection in the current curve referred to above, has been found and shown to be related to an increase in the temperature of the film. To avoid rupture we interrupt the current flow to suppress the maximum in the current curve and thus avoid high temperatures in the film temperature. FIG. II*a* shows the current plots for the continuous (I) and interrupted (II) current depositions at 350 volts of a commercial amine solubilized, styrene-allyl alcohol-based alkyd resin body primer. In this example an unpigmented material was employed. The anodic substrate was a panel of zinc phosphated, cold-rolled steel such as would be employed in automobile body applications. The deposition voltage of 350 volts was about 50 volts above the rupture voltage for the resin employed. FIG. II*b* is a plot of film temperature profiles during the deposition for both the continuous (I) and interrupted (II) depositions at 350 volts.

Referring to FIG. II*a* (I), it is seen that at this high voltage the current maximum was reached in about two seconds. Correspondingly, by referring to FIG. II*b* (I), it is seen that the film temperature quickly reached and maintained film temperatures of 125° to 130° C., sufficient to boil the liquid in the film. Bubble formation was obvious in the ruptured film as deposited. This procedure is unsuitable for a commercial electrophoretic painting practice. Using the same resin and identical panels we interrupted the current flow after one second for about three seconds. The current did not reach nor maintain the maximum value shown in Curve I of FIG. II*a*. As seen in FIG. II*b*, Curve II, the film temperature rapidly fell off. After three seconds' interruption the current was reinstated for only one second to avoid the current maximum. The current was then interrupted for an additional three seconds and was reinstated again. At this stage of film development, after the second interruption, the current is seen to be decreasing. However, it was again interrupted, probably unnecessarily, and then finally reinstated a third time and permitted to flow without interruption until the film was completely deposited.

In this way we successfully deposited film at voltages well above the rupture voltage without causing the film to rupture. The above panels coated in accordance with our interrupted current process were subjected to a series of salt spray exposure tests to evaluate their corrosion resistance. In the case of both scribed and unscribed panels an improvement was observed when interrupted current deposition techniques were used as compared with the continuous deposition procedure. Furthermore, an unexpected improvement was noted in that the films deposited by the interrupted current technique displayed better chip resistance when tested in a gravelometer. Thus the technique of interrupted current electrodeposition has not only been found to suppress film rupture at voltage to provide better throw but has also resulted in improvement of other properties.

In another example, electrophoretic painting tests were carried out using an amine solubilized, maleinized linseed oil resin and carbon black pigment in an aqueous bath. Bonderite No. 40 phosphated steel panels were painted by the respective processes which will be described. The rupture voltage for this resin composition was predetermined to be about 175 volts. This information was obtained by recording the deposition current at various voltages and determining that voltage at which the uncontrolled rise in current occurred. The observation of surface roughness on the coated part confirmed the condition of rupture. In these electrophoretic painting tests the total deposition time in each instance was two minutes. In the following Table I is found a summary of the deposition conditions for this series of tests.

TABLE I.—DEPOSITION CONDITIONS

| Sample designation | Voltage | Current on (seconds) | Current off (seconds) | Number of interruptions |
|---|---|---|---|---|
| Control | 150 | [1] 120 | | |
| 1 | 150 | 3 | 3 | 3 |
| 2 | 190 | 3 | 3 | 3 |
| 3 | 200 | 2 | 2 | 4 |
| 4 | 210 | 2 | 2 | 5 |

[1] Continuous.

A painted control sample was prepared by electrophorectically depositing the maleninized linseed oil resin at 150 volts DC for 120 seconds without any interruption of the current. Subsequent samples were run as indicated at 150 volts, 190 volts, 200 volts and 210 volts wherein the current flow was interrupted in accordance with the above-specified conditions. The "Current On" period was determined by noting the value of the current with time and interrupting the flow of current as it began to increase toward a maximum value. The current flow was arbitrarily interrupted for the same number of seconds as current flow had been permitted. The number of interruptions is summarized in the table. No rutpure of the paint film was noted in samples 2 and 3 although they were prepared at voltages above the rupture voltage. Some evidence of rupture was noted in sample 4. It is believed that this rupture could have been avoided by interrupting the current at a period of less than two seconds.

The throwing power of this paint composition, when applied in accordance with the control and interrupted current processes summarized above, was determined by using a conventional throw box in which two panels, separated by ⅜ inch with rubber separators, were painted. The throwing power of the respective painting processes is summarized in the following Table II.

TABLE II.—THROWING POWER OF INTERRUPTED CURRENT ELECTROPHORETIC PAINTING

| Sample designa)ion | Control | 1 | 2 | 3 | 4 |
|---|---|---|---|---|---|
| Throw (inches) | 7¾ | 8 | 8½ | 9 | Ruptured |

It is seen that the interrupted current deposition of sample 1 provided greater throwing power than the control sample even though both depositions were undertaken at the same voltage. It is also seen that samples 2 and 3, because of the higher deposition voltages, provided still additional throwing power.

A series of corrosion tests were also performed on these prime painted samples. The corrosion tests demonstrate that sample 1 had better corrosion resistance than the control panel even though both were painted at the same deposition voltage. Samples 2 and 3 had better corrosion resistance than either the control sample or sample 1, although both samples 2 and 3 were prepared under deposition conditions at which film rupture could normally have been expected. Thus, it is seen that superior electrophoretic paint films are obtained in accordance with our interrupted current deposition process at voltages slightly below, at or above the normal rupture voltage for a bath composition under conditions of uninterrupted current flow.

We contemplate that our invention can be carried out in either of two basic ways. The current flow during the deposition of substantially every article being painted can be followed either manually or electronically, and the current interrupted whenever it starts to increase toward a maximum which would effect a temperature in the film production of film boiling. Since the rupture voltage for a particular resin can change as the chemistry of the bath changes due to aging, this procedure may be preferred in many instances. However, another entirely suitable method is one in which a current versus time plot is obtained for continuous deposition as was done in FIG. IIa. From this plot can be determined the short period of time that the current can be permitted to flow before it approaches maximum value. Thereafter, until the bath ages and its chemistry significantly changes, the current flow is interrupted with respect to each article being painted at the suitable time determined from this initial plot. Our experience has indicated that during the early stage of film deposition the current should not be initially permitted to flow for more than ten seconds, preferably for no more than about three seconds, before interruption.

The period of the interruption must be suitable to permit the film to be cooled by the paint bath. The duration of current flow interruption is arbitrary, but typically no longer than ten seconds and preferably no longer than five seconds. The relatively cool paint bath and article being painted quickly cool the thin paint film when the deposition current is not flowing. The current is then reinstated but again usually interrupted before it reaches an excessively high value. Usually no more than five interruptions are required to permit the buildup of a film layer of sufficient thickness which will provide electrical resistance such that, thereafter, the current will steadily decrease and not effect boiling of film liquids. Electronic instrumentation is readily available which will permit just such timed on-off cycling for three to five interruptions and continuous deposition thereafter. This is the preferred mode and practice of our invention for production scale operations. The production deposition can be undertaken at voltages well above the rupture voltage without having to monitor the current or temperature after an initial run or runs to determine when the current should be interrupted. Thereafter, if the bath chemistry changes so that the time and durations of the interruptions are not suitable this can be changed if defectively painted parts are produced.

Organic resin coating materials which may be employed in accordance with our invention include, but not by way of limitation, alkyd resins, acrylate resins, epoxy resins, phenolformaldehyde resins, hydrocarbon resins, and other organic resins or mixtures of one or more of the foregoing resins with each other or other film-forming organic materials including binding agents and extenders conventionally employed with paints. Such materials may include or be employed with other organic monomers and/or polymers including, but not by way of limitation, hydrocarbons and oxygen substituted hydrocarbons, such as ethylene glycol, propylene glycol, glycerol, monohydric alcohols, carboxylic acids, ethers, aldehydes and ketones. The film-forming material may include or be employed with pigments, metallic particles, dyes, drying oils, etc., and may be dispersed as a colloid, emulsion or emulsoid. Coating materials adapted for anodic deposition may include one or more of the aforementioned resins having free carboxyl groups or their equivalent in their polymeric structure. Dispersion of these resins in water can be effected by the addition of a suitably basic material, such as ammonia, water soluble amines, mixtures of monomeric and polymeric amines, potassium hydroxide and the like.

While our invention has been described in terms of a few specific embodiments thereof, it will be appreciated that other forms can readily be adapted by one skilled in the art. Accordingly, our invention is to be limited only by the following claims.

What is claimed is:
1. A method of depositing a base solubilized, resinous, polycarboxylic acid material from an aqueous dispersion thereof onto a metal, anodic electrode substrate comprising,
   immersing the metal substrate in the aqueous resin dispersions,
   passing a direct electrical current through said dispersion and substrate,
   interrupting the current flow during the first seconds of resin deposition at a time when the value of said current flow is increasing but reaches a maximum, said interruption lasting only for a period of seconds, reinstating said current flow, interrupting said current flow at least once more until such time as the reinstated current value no longer tends to increase with time, and then passing said current through said solution and substrate without further interruption for a time sufficient to deposit a coating of a predetermined thickness on the substrate.

2. A method of depositing a base solubilized, resinous, polycarboxylic acid material from an aqueous dispersion thereof onto a metal anodic electrode substrate comprising, immersing the metal substrate in the aqueous resin dispersion, passing a direct electrical current through said dispersion and substrate under a voltage greater than the normal rupture voltage for said resin, interrupting the current flow during the first ten seconds of resin deposition at a time when the value of said current flow is increasing but before it reaches a maximum, said interruption lasting only for a period of seconds, reinstating said current flow at said voltage, interrupting said current flow at least once more until such time as the reinstated current value no longer tends to increase with time, and then passing said current through said solution and substrate without further interruption for a time sufficient to deposit a coating of a predetermined thickness on the substrate.

3. A method of depositing a water dispersible, resinous material from an aqueous dispersion thereof onto a metal, anodic electrode substrate comprising, immersing the metallic substrate in the aqueous resin dispersion, passing a direct electrical current through said dispersion and substrate for a first brief period of up to ten seconds, interrupting said current flow for up to ten seconds, again passing current through said solution and substrate for an additional brief period of up to ten seconds, interrupting said current flow for up to ten seconds at least one more time, but not more than four more times, and then passing current through said solution and substrate without further interruption for a time sufficient to deposit a coating of desired thickness on the substrate, the duration of said current flow periods which are interrupted being no greater than the time in which the current flow through the deposited film increases toward a maximum value and levels off.

4. A method of depositing a base solubilized, resinous, polycarboxylic acid material from an aqueous dispersion thereof onto a metal, anodic electrode substrate comprising, immersing the metal substrate in the aqueous resin solution, passing a direct electrical current through said solution and substrate under a voltage greater than the normal rupture voltage for said resin whereby a resin film is deposited and builds up on said substrate, the value of said current flow tending to increase during the initial stages of said film buildup to a value at which aqueous liquid in said film is caused to boil and thereby rupture said film, briefly interrupting the current flow at a time when its said value is increasing but before it reaches said maximum point, reinstating said current flow at said voltage, interrupting said current flow at least once more before said value of said current flow reaches said maximum until the current value upon reinstated flow no longer tends to increase with time, and then passing current through said solution and substrate without further interruption for a time sufficient to complete the deposition of a resin film of predetermined thickness on said substrate.

References Cited

UNITED STATES PATENTS

| | | | |
|---|---|---|---|
| 3,492,213 | 1/1970 | Johnson | 204—181 |
| 3,647,658 | 3/1972 | Hofling et al. | 204—181 |

HOWARD S. WILLIAMS, Primary Examiner